United States Patent [19]
Brown et al.

[11] Patent Number: 5,881,676
[45] Date of Patent: Mar. 16, 1999

[54] ANIMAL LIVING STRUCTURE

[76] Inventors: Michael Brown, 9 Blue Meadow Way, Kanata, Ontario, Canada, K2M 1J5; Kevin J. Bailey, 2370 Tobin Avenue, Ottawa, Ontario, Canada, K2C 1K2

[21] Appl. No.: 638,157

[22] Filed: Apr. 26, 1996

[51] Int. Cl.⁶ ..................................... A01K 1/00
[52] U.S. Cl. ........................ 119/452; 119/421; 119/702
[58] Field of Search ................. 119/475, 417, 119/421, 256, 246, 702, 253, 248, 706, 707

[56] References Cited

U.S. PATENT DOCUMENTS

| | | | |
|---|---|---|---|
| 2,571,880 | 6/1956 | Markowski | 119/246 |
| 3,260,236 | 7/1966 | Jones | 119/421 |
| 3,857,364 | 12/1974 | Miller, Jr. | 119/421 |
| 4,006,711 | 2/1977 | Frank | 119/256 |
| 4,651,675 | 3/1987 | Collier | 119/702 |
| 4,677,938 | 7/1987 | Tominaga | 119/421 |
| 5,054,427 | 10/1991 | Hoover | 119/452 |

*Primary Examiner*—Gene Mancene
*Assistant Examiner*—Yvonne R. Abbott
*Attorney, Agent, or Firm*—R. J. Austin

[57] ABSTRACT

A pet animal living structure with an upward extending body and floor surfaces at different heights. The latter are arranged in two pluralities with a second plurality being disposed in a different vertical plane from the first. Floor surfaces of the second plurality provide access between floor surfaces of the first plurality which have a wall barrier between them. The structure causes an animal to move in three dimensions throughout the structure along an indefinite number of paths. Alternatively, a freestanding structure is provided which faces in different horizontal directions with the floor surfaces extending around the structure. As a further alternative, a structure is provided with floor surfaces interconnected by steps and apertures and which may be suspended within an aquarium.

9 Claims, 9 Drawing Sheets

ANIMAL LIVING STRUCTURE

This invention relates to animal living structures.

Animal living structures for use inside domestic buildings have been generally known for many years. These structures have differed in design not only with the aim of satisfying the particular type of environment in which it is believed a specific type of animal is most comfortable when in a state of captivity, but also at the specific whim of the designer. Thus, many types of design are known. These types include cages for domesticated birds and also table or floor mounted structures of a single or multiple storey construction for other animals, e.g. pets such as hamsters or mice.

In addition, in U.S. Pat. No. 4,677,938 there is described a "gymnastic device" for small animals in which a vertical partition is inserted into a transparent breeding box and horizontal plates are carried upon the or each partition to form walkways for the animals. One of the objects of this patent is to enable the owner of the animals to enjoy seeing them moving around the box. In a further U.S. Pat. No. 4,850,306, an animal cage is described which comprises an enclosed rectangular structure positioned above the open top of an animal tank. A suspended floor is located within the tank intermediate the rectangular structure and the bottom of the tank. Ramps extend between the suspended floor and the rectangular structure and the bottom of the tank. In addition, U.K. Patent Application No. 2148087 describes a pet animal enclosure which is a flat vertically disposed box with a removable front. Ramps are provided for the animal to move upwards and downwards within the box which may be wall mounted.

The present invention seeks to provide an animal living structure of new concept and which will challenge a pet animal in the manner in which he moves within the structure while providing greater interest to the viewer.

Accordingly, the present invention provides a pet animal living structure having an upwardly extending body and a wall arrangement which extends forwardly out from a side surface of the body and defines a first and second pluralities of upwardly facing floor surfaces, in each plurality the floor surfaces being at different heights, with one of the pluralities of floor surfaces at least partly disposed in different vertical planes from the other plurality of floor surfaces, and with the internal wall arrangement providing barriers between some at least of the first floor surfaces and with the floor surfaces of the second plurality providing for movement of the animal between floor surfaces of the first plurality which have barriers therebetween.

The above structure provides not only for movement of the animal upwards or downwards in the structure, i.e. in two dimensions, but also provides for movement in the third dimension at any height in the structure. With the floor surfaces of the second plurality affording provision for movement between floor surfaces of the first plurality, the animal is occasioned to move forwardly and rearwardly as it moves throughout the structure.

Preferably, the floor surfaces are relatively positioned to provide diversity to the choice of paths to be followed.

With the above structure according to the invention, the first plurality of floor surfaces may be disposed either rearwardly or forwardly of the second floor surfaces and the second floor surfaces may be disposed at different heights from either or both of the first floor surfaces with which they are associated. Either of the floors of the first and second pluralities may have spaces therebetween to cause the animal to stretch across the spaces as it moves along chosen paths. To this end, adjacent spaced floor surfaces may be positioned at different heights to provide spaced steps which may be provided by either one or both of the pluralities of floor surfaces.

In its basic form, the structure of the invention may be provided for location within a transparent container such as an aquarium with the wall arrangement extending outwards into the aquarium or positioned with the wall arrangement extending out to lie close to a wall of the aquarium. In these cases, the structure may be open at the front. Alternatively, the structure is for separate use in which case a removeable front wall is provided to close the structure and at least some of the floor surfaces are viewable through the front wall. Where a front wall is provided then side walls are also included and these preferably have openings for air into and through spacial regions of the structure. It is advantageous to have at least one upper opening into the structure with the latter arrangement to enable air to circulate through the structure, i.e. through the sides and out through the upper opening. This is assisted with spaces provided between the front wall and the wall arrangement to permit air to pass through. Conveniently these spaces are formed at least partly by the spaces between floor surfaces.

In a preferred arrangement, the front wall is slideably mounted vertically within channels carried by the side walls. These channels have openings aligned with the openings in the side walls.

When to be used outside an aquarium, the structure may include means to enable the structure to be supported on a wall. Alternatively, the support means may comprise a stand which supports the structure with the front wall extending upwards so that when viewed from the front, an animal may be seen to be moving through the spacial regions either horizontally or vertically with its three dimensional freedom of action.

Ideally the structure includes distinctly separate room regions having floor surfaces of one plurality and which are interconnected by floor surfaces of the other plurality.

The front wall may be made from glass or plastic and may be entirely transparent or may be transparent in certain regions with other regions being opaque such as an opaque region located directly in front of a nest area where it is believed an animal may require some degree of privacy. Alternatively, the front wall may be made from wire mesh. One room region may be an excercise area for the animal and in which a rotable excercise wheel is mounted about a rotational axis which extends normal to the upwardly extending rear body.

While the front wall or part thereof may be removed for the purpose of inserting food into a specific location of the structure, ideally at least one of the side walls, preferably a top wall, has at least one opening provided for insertion of food into a specific spacial region of the structure. Such a specific region may have a depression in a floor surface for accommodating the food so as to maintain the food in that region. In addition, another opening is preferably provided through the top wall for a water feed tube into the structure. One or both of these openings may provide the function of enabling air to circulate upwards through the structure.

According to a further aspect of the present invention, there is provided a freestanding pet animal living structure comprising a body and a wall structure arrangement extending outwards in different horizontal directions from the body to provide upwardly facing floor surfaces at different heights around the structure, with at least some of the floor surfaces extending from one position extending in one horizontal direction to another position extending in another horizontal direction.

With a freestanding structure according to the further aspect of the invention, the animal may be viewed moving through the interconnected spacial regions and at different heights from various viewing positions around the structure and with the animal moving around the structure between floor surface regions. The freestanding structure may be of different constructional designs. For instance, the spacial regions may be completely open with the structure intended for use within a confining container such as an aquarium. Alternatively an outer wall may be provided which may have a plurality of planar faces or facets which are inclined inwardly of the body of the structure. In a preferred arrangement the planar faces are joined end to end horizontally to provide the perimeter of the structure to form a continuous facetted surface and the wall structure extends completely around the body. In one advantageous construction, the structure is generally pyramidically shaped so that the outer wall faces upwardly towards a viewer from any viewing position around the structure. When the outer wall is inclined and also when it is of a general pyramidic shape, it is convenient for the outer wall to be detachable from the body by raising it from the body. With this arrangement the outer wall may be a single unit which may be a single molding of plastic and the outer wall is retained under its own weight upon the body of the structure. Also when generally pyramidically shaped, the structure may have a frusto form with a flat top. This flat top is preferably provided as a room region beneath a top surface of the outer wall and the room region is interconnected with the spacial regions extending at different heights around the structure.

Alternatively to the structure being generally in the shape of a pyramid, it may take other forms, for instance it may be cylindrically, oval or eliptically shaped in a horizontal cross-section.

Embodiments of the invention will now be described by way of example, with reference to the accompanying drawings, in which.

Figure 1:
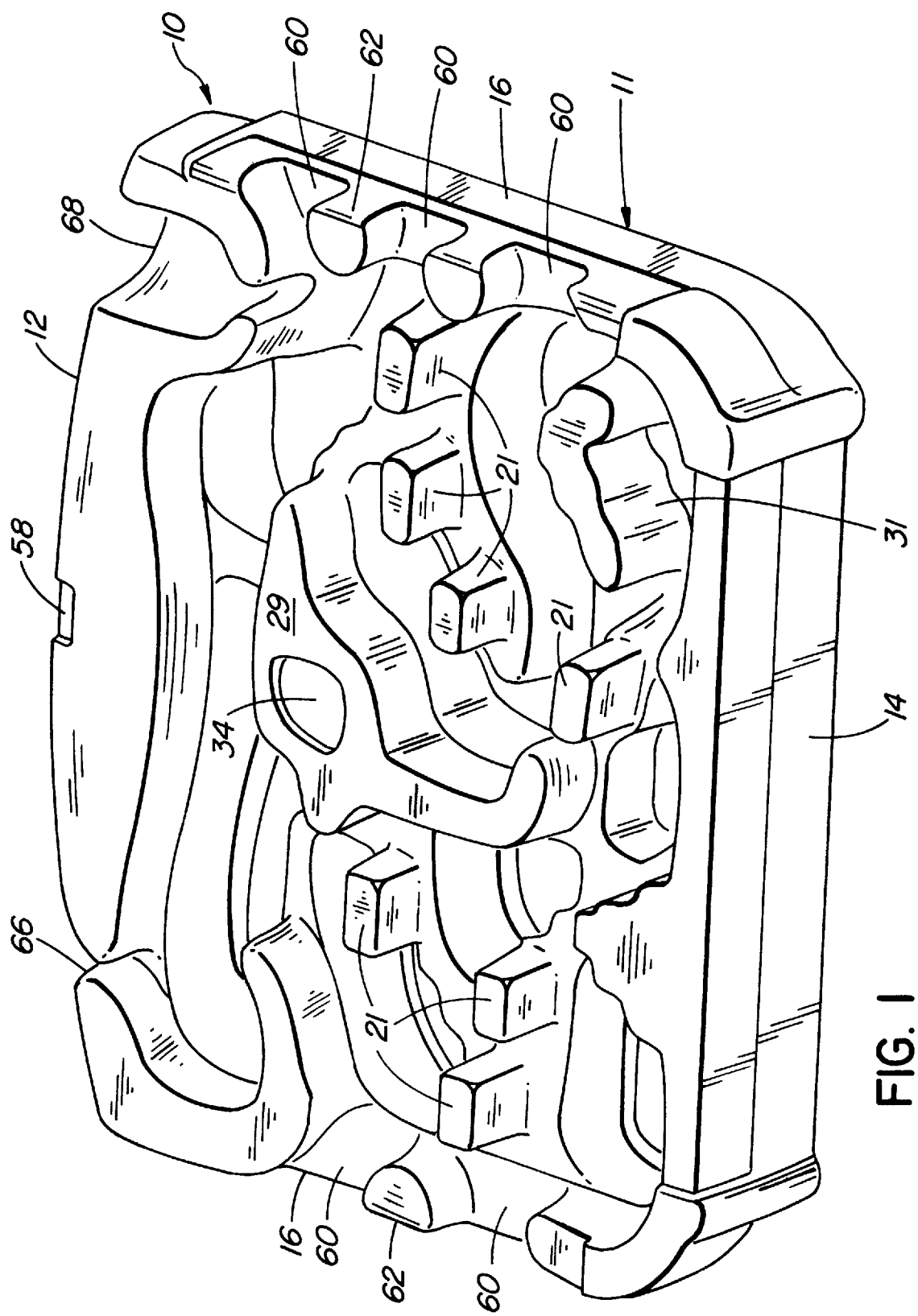
FIG. 1 is a front isometric view from a lower corner of an animal living structure according to a first embodiment with a front wall omitted and showing basic detail.

As shown by FIG. 1 a pet animal living structure 10 of a first embodiment is of rectangular construction with a body 11 having side walls in the form of a top wall 12, bottom wall 14 and left and right side walls 16. All of these walls extend from an upwardly extending body in the form of a back wall 18 (see FIGS. 2, 3 and 5). The back wall 18, top and bottom walls and the left and right side walls are integrally formed, together with an internal wall arrangement to be described, as a single integral unit from a suitable plastics material, by plastics molding. A suitable plastic material in the embodiment is high density polyethylene, but other materials, e.g. a metal formed by diecasting would suffice.

The back wall has a front vertical surface 19 (see FIG. 4) and from the back wall the internal wall arrangement extends forwardly to provide internal walls 20 and steps 21. The steps 21 terminate at a common frontal vertical plane at which a planar front wall is located. The front wall is a transparent plastic or glass front cover 22.

Figure 2:
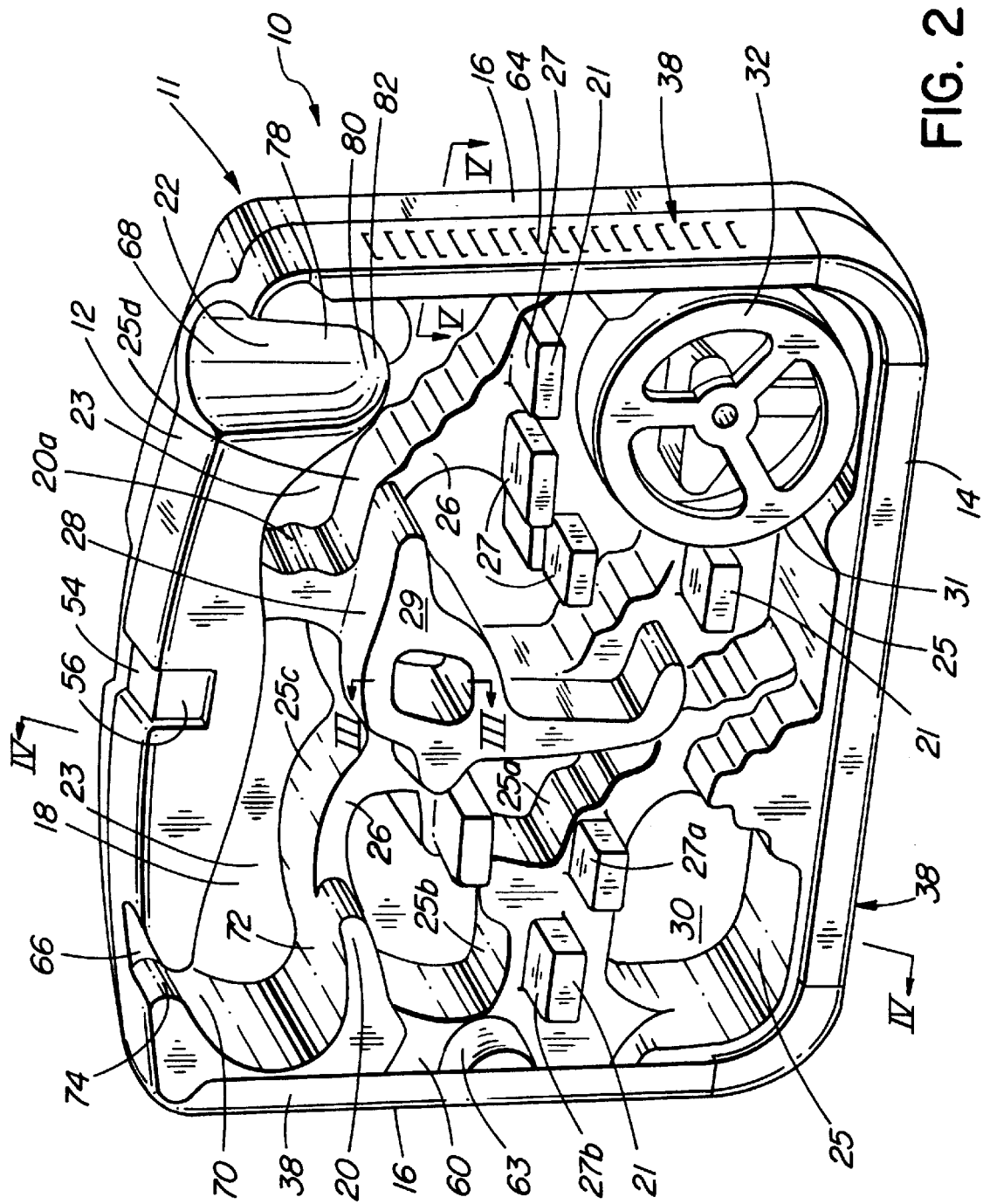
FIG. 2 is a front isometric view of the structure of FIG. 1 and taken from an upper corner of the completed structure.
Figure 3:
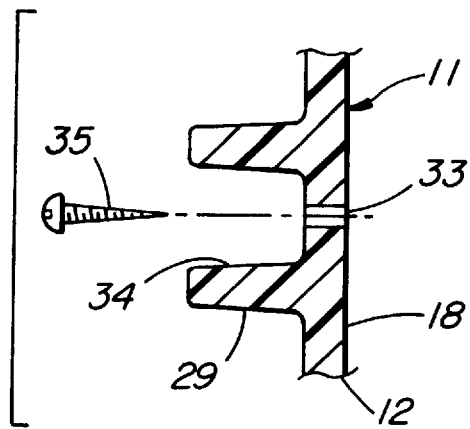
FIGS. 3, 4 and 5 are cross-sectional views of parts of the structure taken respectively along line "111—111", "1V—1V" and "V—V" in FIG. 2.
Figure 4:
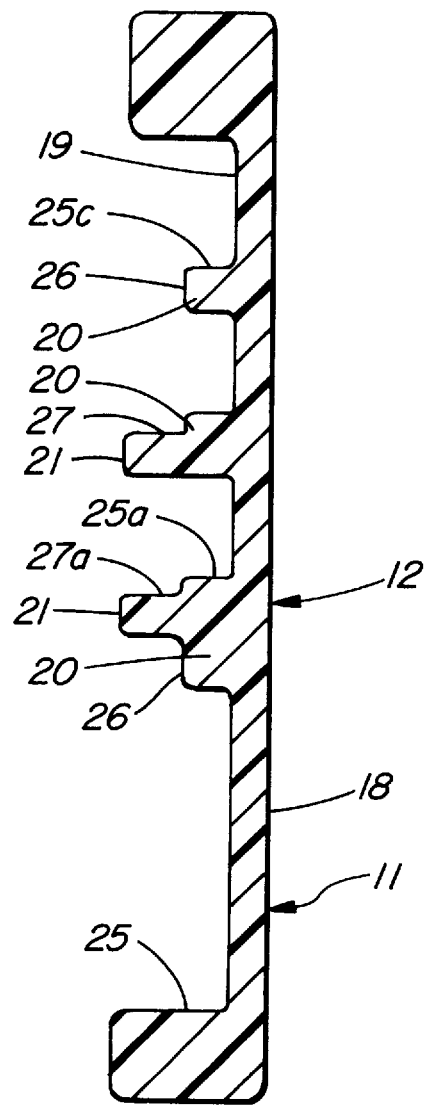

The internal walls 20, FIGS. 1, 2 and 4, project forwardly from the back wall to define room regions having upwardly facing floor surfaces 25. In the main, the internal walls extend forwardly for part of the distance (e.g. about halfway) from the back wall to the front cover 22 to terminate at these locations in vertical forward facing surface 26 spaced from the front cover to permit access for the animal to move from room to room. Hence, the room regions extend as cavities through a common forwardly facing wall surface 26 with the floor surfaces 25 providing ledges in the cavities The steps project from the wall surface 26. The steps 21 are spaced from one another and are disposed forwardly from the walls 20 to provide localized floor surfaces in the form of step surfaces 27. These step surfaces 27 are thus disposed forwardly of the floor surfaces or ledges 25 and provide the only means by which the animal may move between certain floor surfaces 25 which have vertical barriers 20a therebetween provided by the wall arrangement. Thus, the structure provides floor surfaces 25 and 27 disposed at different heights in the structure, but also these surfaces are disposed at different distances from the front cover 22. In other words, the step surfaces 27 are closer to the cover 22 than are the floor surfaces 25 and the animal is forced to move in three planes. Hence, to move from floor surface 25a in FIG. 2 to floor surface 25b, the animal needs to move forward on to step surfaces 27a and 27b in sequence to attain this objective. In at least one particular instance, a floor surface which is not provided by a step enables the animal to move between floor surfaces 25. This is shown where, at the top of the structure, floor surfaces 25c and 25d of top room regions 23 are interconnected by floor surface 28 which is disposed forwardly of the surfaces 25c and 25d and is provided upon a centrally disposed forwards barrier 29. Also, as may be seen from the Figures, the floor surfaces or ledges 25 are of non-planar random configuration and are spaced apart by different distances.

The room regions also comprise at the bottom left and right hand sides, a nest region 30 and an exercise region 31 which accommodates a rotatable exercise wheel 32 which is rotatably mounted upon the back wall and extends outwardly into the region 31 normal to the plane of the back wall.

Means are provided by which the structure 10 may be supported with the back and front walls extending upwards and with the floors 25 of the spacial regions disposed at different heights. This orientation of the structure would easily be accomplished by hanging it from the wall of a room, the front of a shelf structure, or possibly from a vertical pillar in a room. The supporting means may comprise any suitable means for hanging the structure vertically.

In the embodiment, (FIG. 3), the supporting means comprises a screw 35 which passes through a hole 33 in the back wall 18. The hole is located at the base of a blind hole 34 formed in the projection 29. Other screws 35 may also be provided through similar holes 33 if required. Other supporting means which may be used includes an alternative comprising wall brackets for engagement with a complimentary bracket on the rear of the back wall 18 (not shown) or hooks pivotally mounted upon the back wall 18 for receiving screws which are mounted into the building wall. Should the size be substantial such as to create concern that the support means could be inadequate to carry the weight of the structure, it is possible to support the weight of the structure upon a narrow shelf also mounted upon the wall with the proviso that the support means in the form of hooks or a bracket, for instance, would still be necessary to prevent the structure from moving away from the wall.

Figure 5:
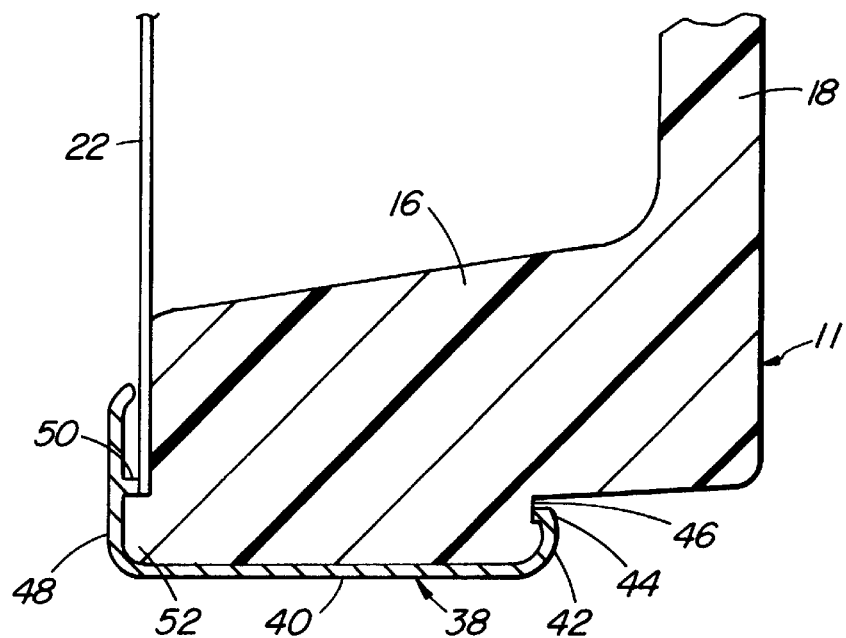

To provide access to the interior of all of the structure and to reach all the interconnecting spacial regions, the front wall 22 is detachably mounted upon the free edges of the walls 12, 14 and 16. Any convenient means for detachably holding the front wall in position may be used. In the embodiment, as shown in FIGS. 2 and 5, the means comprises three channels 38 mounted upon exterior surfaces of the walls 12, 14 and 16. Each channel 38 is basically U-shaped (FIG. 5) with a base 40 extending from the front towards the rear of the structure to terminate at the rear of the channel in a short leg 42 with a short inward turned flange 44 received in a rear facing channel 46 of the appropriate wall 12, 14 and 16. At the front there is provided a longer leg 48. Intermediate the ends of leg 48 is another inwardly turned flange 50 extending around a forward facing wall buttress 52. Each channel 38 is a tight friction fit on its wall. As shown by FIG. 2, the front wall 22 is slideable vertically into and out of its assembly position to the body 11. The front wall is moveable upwards from open top ends of the vertical channels 38. The front wall is guided at its edges within a gap (FIG. 5) formed behind the free end of flange 50. In its assembled position the front wall is carried by the bottom channel 38.

To retain the front wall in position, a resilient U-shaped clip 54 is resiliently flexed over the top wall 12 with a front leg 56 extending around the front wall (FIG. 2). The clip is received within a suitable recess 58 in the top wall.

As shown particularly by FIGS. 1 and 2, the walls 16 are formed with wide recesses 60 from the front face to provide gaps comparable in size to the spacial regions within the structure. The recesses define forward facing steps 62 with step surfaces 63 (FIG. 2), the reason for the steps being discussed below. To enable air to circulate throughout the structure, each side channel 38 is formed with pressed out lateral slots 64 some of which are aligned with the recesses 60.

As the structure is to be mounted in a vertical position, it is convenient to provide access at the top of the structure for food and water for the animals. For this purpose, the top wall 12 is provided with two access openings, an access opening 66 for food on the left hand side and an access opening 68 for water supply on the right hand side. As shown by FIGS. 1 and 2, the access opening 66 communicates with a downwards spacial region 70 which terminates at its lower end in a depression 72 in a top floor surface 25c for accommodating the food. This depression 72 should normally be capable of holding the food supply and should resist any tendency for food to become scattered through the structure. As may be seen from FIGS. 1 and 2, the spacial region 70 has a neck portion 74 which is made sufficiently small to prevent the pets from moving up this region and possibly attempting to escape through access 66. The access opening 68 is for the insertion of a water feed tube (not shown) into another downward region 78 with the bottom end of the tube being carried upon a lower end 80 of the region 78. A downward opening 82 is provided for region 78 for location of a water tube outlet for ease of access to pets within the structure.

As may be seen from the above embodiment, the structure 10 is carried entirely upon a vertical surface such as a wall of a room. Hence, the structure may be of any desired size while not covering any horizontal supporting surface area such as is normally required for conventional animal living structures, e.g. tables or benches. In fact the structure when mounted upon a wall need only be slightly deeper than pictures which may be mounted thereon and, while being accessible and also open for viewing, is largely unobtrusive and leaves horizontal surfaces, such as tables, benches, or floors open for supporting other and more mundane articles within the room. The structure is also of simple manufacture and with its interconnected floor surfaces disposed at various heights, it is particularly useful for accommodating small burrowing type animals in an environment which, to them, should seem not far removed from what they would expect in a natural environment.

In addition, while the structure 10 is vertically disposed with vertical movement provided for animals, there is also an enforced movement required in a front to rear direction to enable animals to move by way of the steps 21 to the various floor surfaces 25.

As will be noticed, the locations of the floor surfaces 25 and 27 are such that the animal may follow, at choice, any of a multitude of different paths in a three dimensional manner throughout the structure. The spacing of the step surfaces 27 ensures that the animal needs to stretch across open spaces during its travels and because of the different relative heights of the step surfaces, such stretching may need to take place in an upward or downward fashion.

In addition, the air circulation is such that air enters the structure through the slots 64 and recesses 60, and flows upwardly through the spaces between the front wall and front edges of the floor surfaces 25 and out through the access opening 66. There is a tendency for a slight upward movement of air through the structure.

Figure 6:
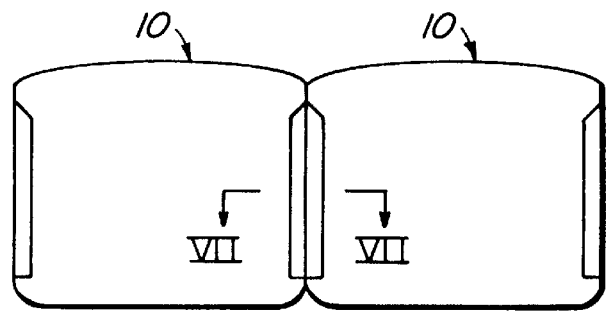
FIG. 6 is a front elevational view of two animal living structures joined together as a single construction.
Figure 7:
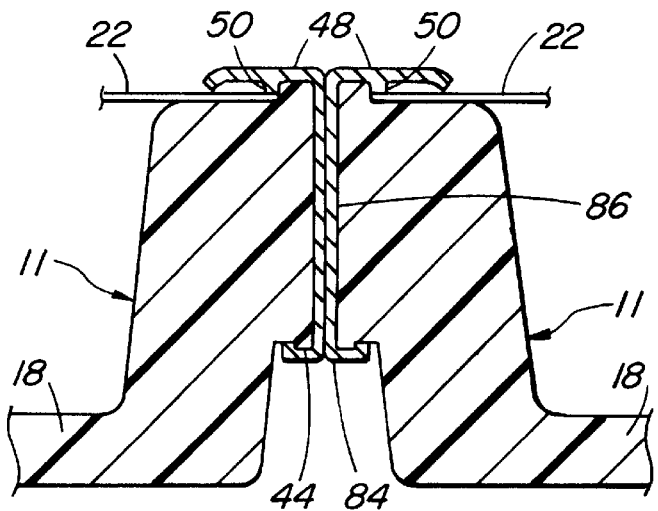
FIG. 7 is a cross-sectional view taken along line "V11—V11" in FIG. 6.

As shown by FIG. 6, two or more of the structures 10 may be abutted side by side so as to interconnect the spacial regions for movement of the animals. For this purpose the adjacent vertical channels 38 are removed and other channels replace the channels 38. These other channels have large openings which align with the recesses 60 which are themselves aligned from structure to structure so that animals may move freely between the structures. In a practical arrangement as shown by the section in FIG. 7, two adjacent channels 38 of two abutting structures are replaced by a single channel 84 having flanges 44 and 50 on both sides of a base 86. The channel 84 thus serves to locate and register two adjacent structures 10 together correctly. The channel 84 does, of course, have the necessary openings (not shown) for interconnecting recesses 60 of the adjacent structures.

Figure 8A:
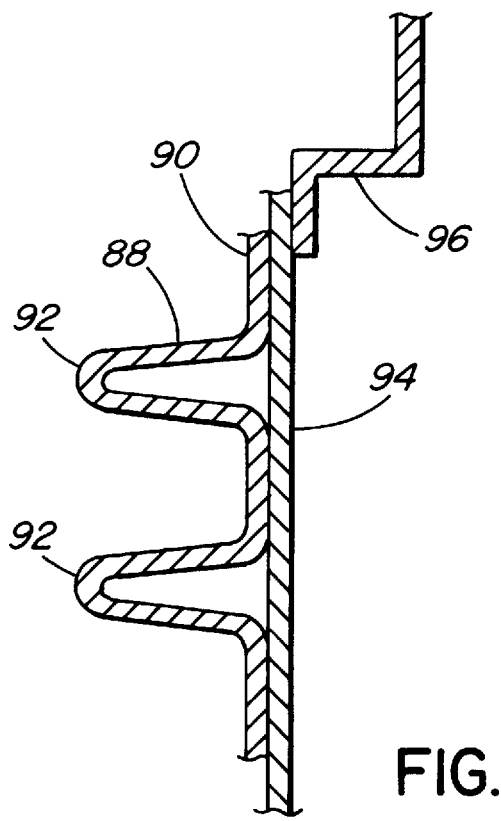
FIG. 8a is a cross-sectional view similar to FIG. 3 of a modification to the first embodiment.

While in the embodiment described above, the structure, apart from the front wall, is described as being formed by a plastic molding or by a diecast operation, alternatively other methods may be used to produce a back, side, and internal walls. For instance, as shown in a modification by FIG. 8a, the internal wall structure 88 is formed by a metal pressing operation from a sheet 90 so as to form internal walls 92. The sheet 90 may then be secured to a suitable rigid back wall 94 which is provided with at least one support means such as a support bracket 96, although a hole (not shown) similar to hole 33 in the first embodiment with accompanying fastening screw may be provided.

Figure 8B:
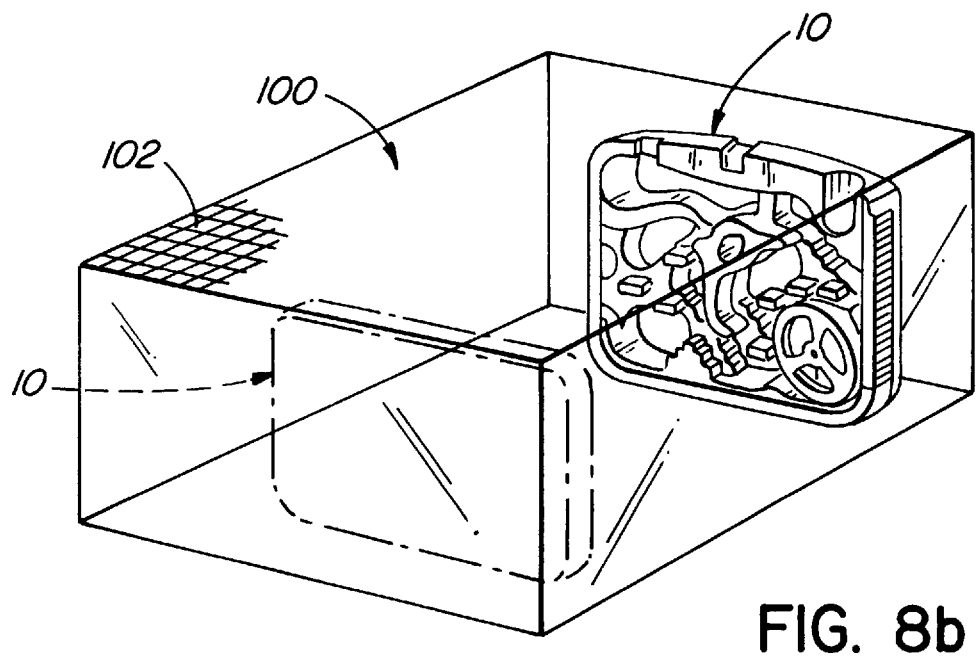
FIG. 8b is an isometric view, on a smaller scale, to show another modification of the first embodiment installed in an aquarium.

In a further modification of the first embodiment (FIG. 8b), the structure 10 is disposed within an aquarium 100 within which it is freestanding vertically with the front wall omitted. The structure 10 may be disposed at one end of the aquarium with the wall arrangement facing outwards into the aquarium (full outline position). Alternatively, the structure 10 is located at other positions along the aquarium (for instance as shown by chaindotted outline). In such other positions with the wall arrangement facing and closer to the opposite end wall of the aquarium, the structure 10 is sufficiently narrow to provide a gap for free movement of the animal within the whole aquarium. In any position of the structure, the animal may enter it and move freely on to any of the floor or step surfaces 25 and 27 as described in the first embodiment. If required, a cover such as mesh 102 may be provided over the aquarium.

Figure 8C:
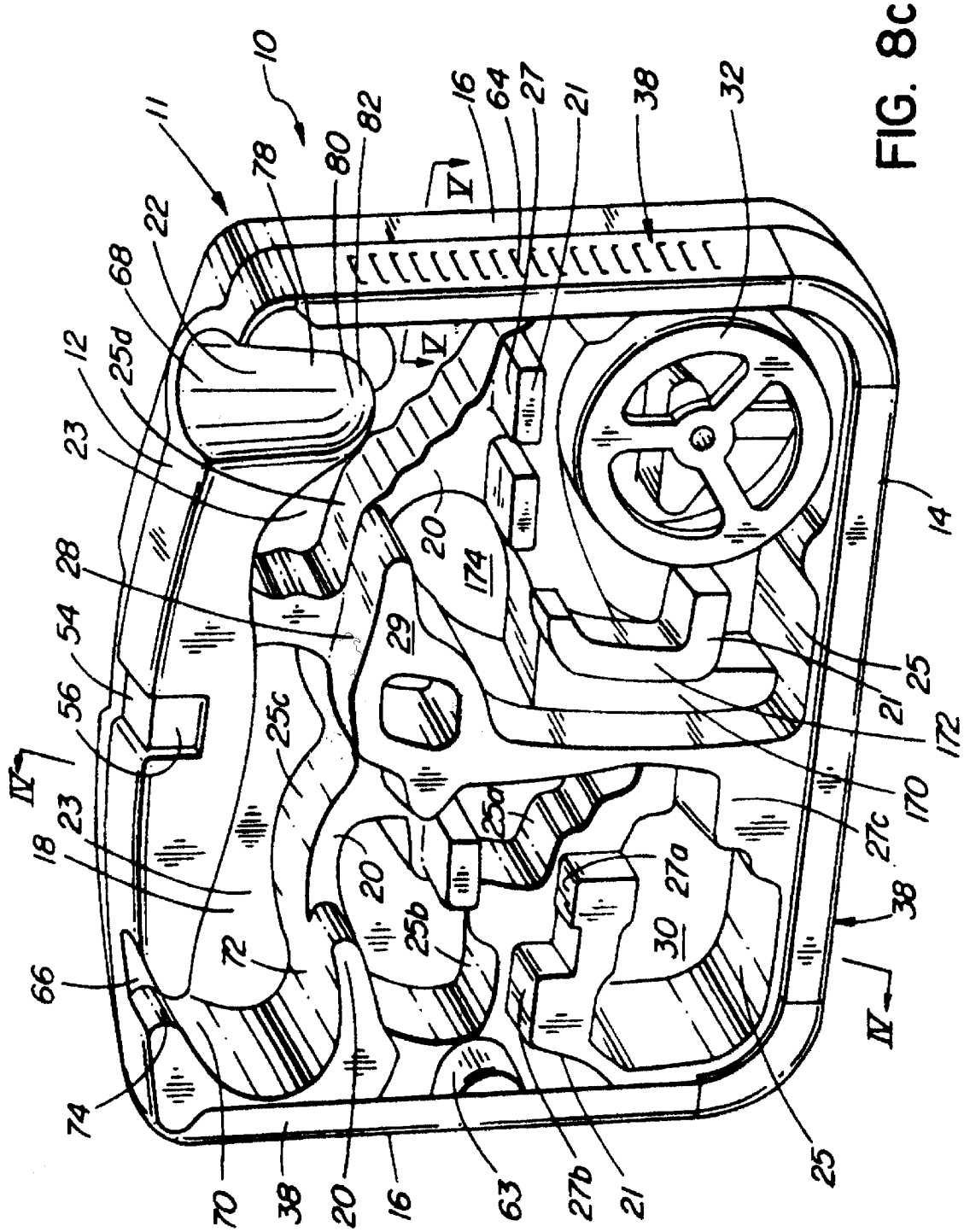
FIG. 8c is yet a further modification of the first embodiment.

In yet a further modification of the first embodiment, the structure is similar to that described with reference to FIGS. 1 and 2 except for the following differences. As shown by FIG. 8c the room region 30 is more clearly defined as a room as two of the steps 21 having step surfaces 27a and 27b are joined across so that the room region 30 has only one access, i.e. downwardly from step 27a and upwardly from step construction 27c. In addition, the structure to the left of the exercise wheel 32 is modified. In this modification the projection 29 extends downwards to be formed integrally with step construction 27c to define one side of a vertical chimney 170 also partly defined on the other side by a vertical projection 172 which is spaced from a lower floor surface 25 to provide access into the chimney from the exercise wheel 32. The chimney opens at its upper end into a room area 174. The chimney is of a width sufficient to enable the pet animal to climb up it or move downwards as desired to and from the exercise wheel.

In the first embodiment, and modifications thereof, and in further embodiments to follow, the design of each structure is preferably determined with the object of preventing gnawing animals from damaging the structure. It has been found that dependent upon the animal species which is intended to be housed in the structure, all outwardly facing corners should be convex and have a certain radius. As indicated, this radius is dependent upon the animal species. It has been found that when hamsters are intended to be accommodated in the structure, then this radius should be preferably in the region of 3mm.

In a further modification of the first embodiment (not shown), the back wall 18 is molded from transparent material and a drawing or photograph is mounted upon the rear surface of the back wall so as to be seen from the front of the structure. This picture may for instance be a country or tropical scene or any other suitable picture for the requirements.

In a further modification of the first embodiment (not shown), a drawing or photograph is mounted upon the front wall and the back wall is made transparent as in the first modification described. The structure is made sufficiently strong to enable it to be supported in the reverse position with the front wall carried upon a wall of a room. The picture or photograph may then be seen through the rear wall which then faces into the room.

In a second and third embodiments now to be described, a free-standing animal living structure is discussed in each case. These structures differ, therefore, basically from the first embodiment in that they are not intended to be mounted upon a wall while still having spacial regions disposed at different heights and also other attributes as will now be discussed.

Figure 9:
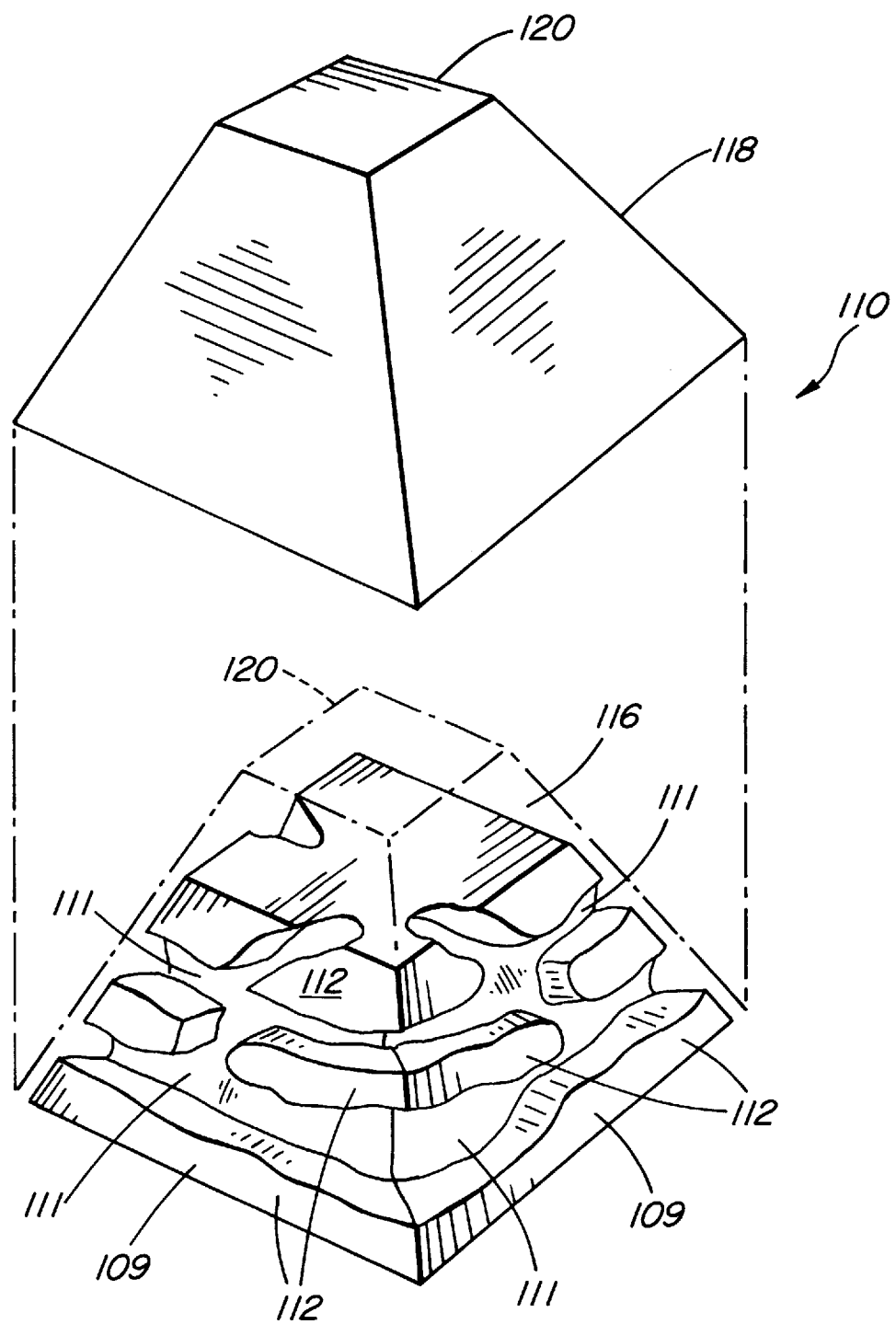
FIG. 9 is a front exploded isometric view of an animal living structure according to a second embodiment.
Figure 10:
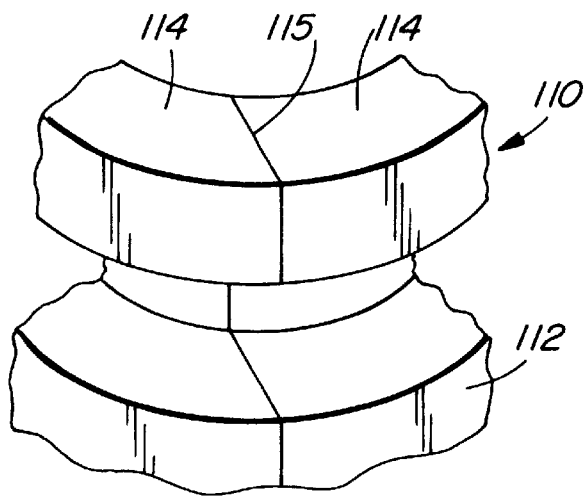
FIG. 10 is an isometric view of part of the structure of the second embodiment to show detail.

In a second embodiment as shown by FIGS. 9 and 10, a free-standing structure 110 has a body generally of pyramidical shape with a top portion of the pyramid omitted to form the structure into a frusto form. Thus the structure has four upwardly inclined side surfaces 109 which are tapered upwardly and provide faces around all four sides of the structure. Each of the side surfaces 109 is formed with interconnected spacial regions 111 defined by walls 112 of a wall arrangement and having floor surfaces 113. Thus the spacial regions provided upon each of the side surfaces 109 of the second embodiment need not be discussed in further detail. It should suffice to state however that the interconnected spacial regions on each side surface may be interconnected with spacial regions on adjacent sides, with the floor surfaces 113 extending from side to side, such as is shown by FIG. 10. Alternatively, (not shown) the spacial regions on each side surface 109 are completely disconnected from those on the other side surfaces. In the latter case, different animals, possibly from different species, may be accommodated in the different spacial regions of the enclosure if required.

As shown by FIG. 10, the structure of the second embodiment is made in a manner similar to the manufacture of the first and second embodiments in that four sides 114 are provided each as a single unit with its walls 112. The sides are subsequently joined together, possibly by a suitable adhesive, along abutting edges 115, for instance as shown by FIG. 10. It may be convenient with a structure as described in the second embodiment, for a top section of the structure to be provided as a single large room 116, instead of there being interconnected passages or smaller separate rooms at the top section. In the large room 116, may be provided any suitable toy or exercise device for the pet. A suitable cover 118 is provided to extend over the assembled sides 114 while allowing required height to the room 116. As shown by FIG. 9 the cover 118 may be conveniently molded from transparent plastic as a single unit and may have a flat top 120 to form a top cover for the room 116. Alternatively, as shown in chaindotted outline in FIG. 9, the top of the cover may extend upwardly to any required position to increase the height of the room 116 as desired. The pyramid shaped structure lends itself readily to the use of the unitary cover 118 which may be merely placed over the sides 112, the cover then being retained in position under its own weight.

With the second embodiment as will be appreciated, it is possible to view a pet within the structure from any viewpoint within a room if the structure is standing upon a support surface, in that the pet is free to roam at will around the four sides of the enclosure.

Figure 11:
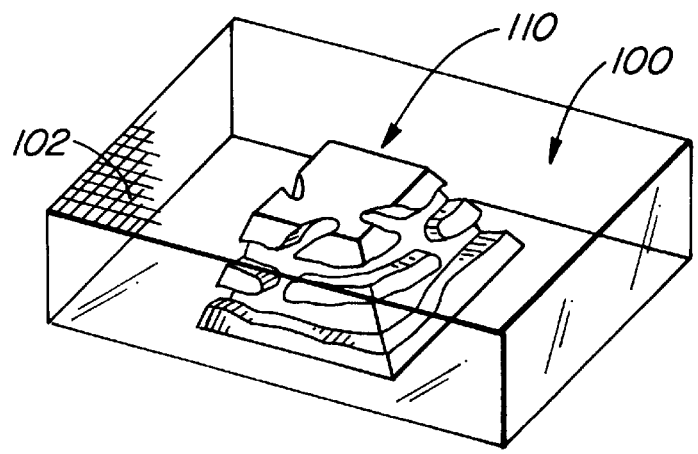
FIG. 11 is an isometric view of a modification of the second embodiment.

In a modification of the second embodiment (FIG. 11) the structure 110 is located within an aquarium 100 with the cover 118 omitted. Thus the structure is freely open for an animal housed within the aquarium to use, thereby increasing the useable space of the aquarium.

Figure 12:
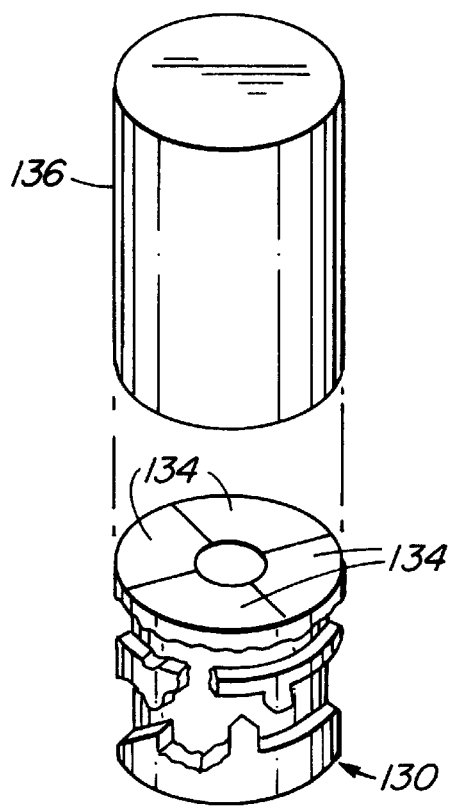
FIG. 12 is a view similar to FIG. 10 of a third embodiment.

A freestanding structure need not be of the shape shown in the second embodiment, but may be of any desired shape. For instance, as shown in a third embodiment by FIG. 12, a structure 130 is basically of cylindrical shape with interconnected spacial regions extending around it at different heights. The structure 130 may be formed in a manner which is deemed to be most convenient. For instance, in the embodiment shown in FIG. 12, the structure 130 is formed in four quadrants 134 which may be joined together, for instance by adhesive, with the spacial regions interconnected from one quadrant to another. A suitable transparent cover 136 may be made as a single unit for lowering onto the cylindrical shape of the structure body.

Figure 13:
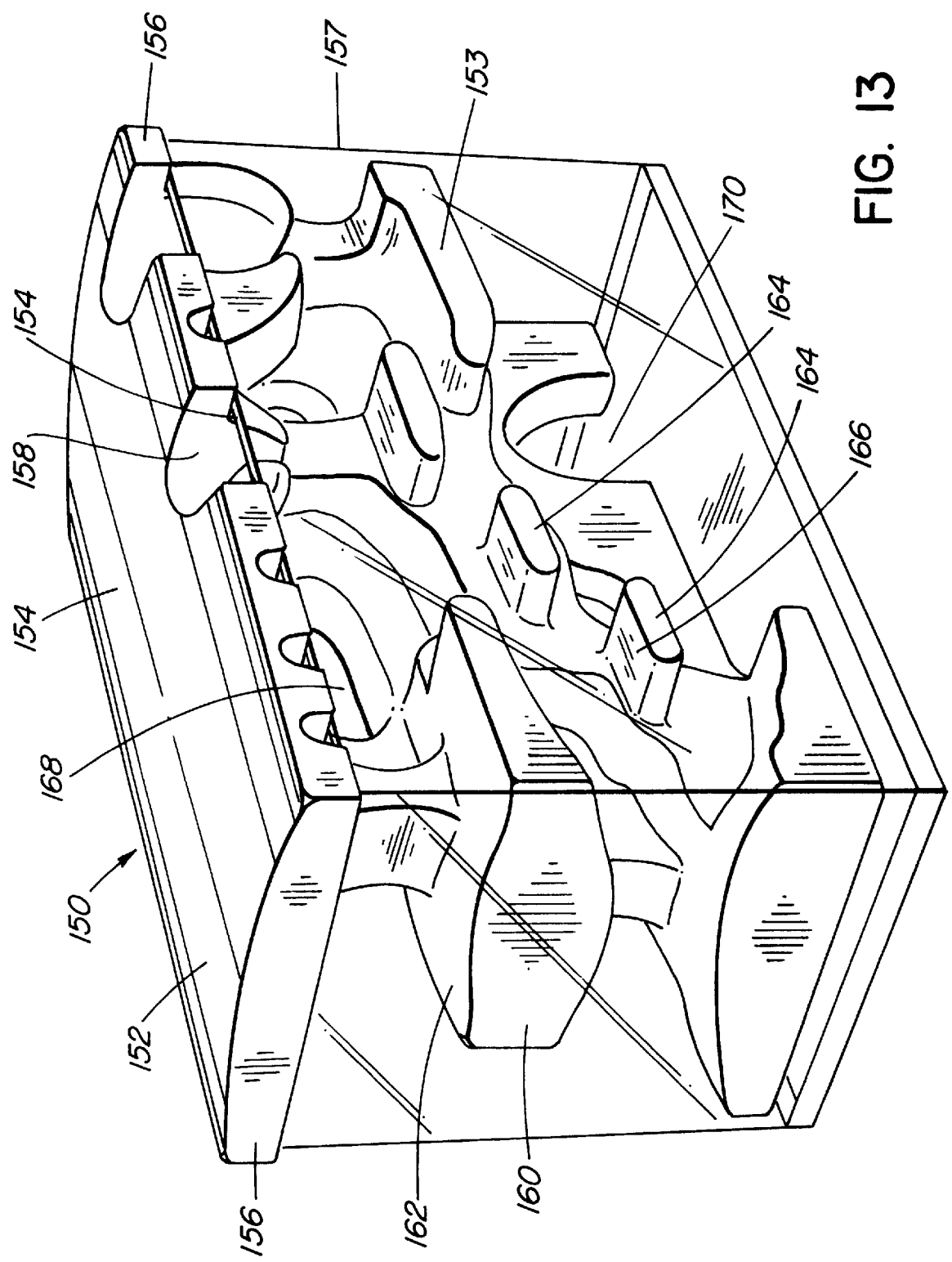
FIG. 13 is an isometric view of a structure according to a fourth embodiment fitted into an aquarium.

In a fourth embodiment (FIG. 13), an animal living structure 150 is a molded plastic body having an upper support 152 from which integrally depends a lower body 153 providing a thoroughfare for animals. The support 152 has a substantially smooth upper surface 154 (although this could be of any desired form) and projects horizontally outwards beyond the body 153 to provide a downward facing flange 156 which is non-continuous and is interrupted by openings 158 in the support. The flange follows a rectangular shape in plan and surrounds the body 153. The outline of the flange is such as to be to supported upon the top edge of the glass walls of a specific conventional size of rectangular domestic aquarium 157 with the support extending across the top of the aquarium so as to cover it except for the openings 158. Hence the body 153 lies inwards of the flange 156 so as to lie within the aquarium as shown in FIG. 13. The body 153 may be spaced entirely from the aquarium walls or may substantially contact the walls in certain locations. Also the body 153 may substantially contact the base of the aquarium or be spaced from it. This distance from the base should be such as to enable an animal to move freely between the base and the body 153. Alternatively, the body 153 may be of such dimensions as to rest upon the base of the aquarium with the flange 156 spaced slightly above the walls by a distance insufficient to allow for escape of an animal. In this case the openings 158 are not required as air will pass freely into the aquarium beneath the flange.

The body 153 is formed with horizontally projecting walls 160 with floor surfaces 162 and steps 164 having localized floor surfaces in the form of step surfaces 166. The step surfaces permit an animal to progress between floor surfaces 162. The body 153 is also formed with apertures 168 which are spaced from a base of the body 153 to permit an animal to move from one side of the body to the other, i.e. between floor surfaces 162 or to move on the base of the aquarium through lower apertures 170.

With the flange 156 supporting the structure 150 in the aquarium, the openings allow for air interchange within the aquarium.

The structure of the fourth embodiment is particularly suitable for reuse of an aquarium which was previously used as originally intended for housing fish.

The embodiments of the invention in which an exclusive right or privilege is claimed are defined as follows:

1. A pet animal living structure comprising a first and upper rigid body element from which rigidly depends a second rigid body element integral with the first body element, the first body element having a substantially planar undersurface provided to face upper edges of and be supported by walls of a transparent container with the second body element extending into the container, and the second body element having front and back sides each formed with floor surfaces for supporting the animal and allowing for its movement from the floor surface to floor surface.

2. A pet animal living structure comprising a wall having a wall side surface and formed with a plurality of cavities extending through the wall side surface, the cavities defining ledges, the walls also having steps which project from the wall side surface to define paths for movement of the animal between the ledges.

3. A pet animal living structure according to claim 2 wherein the wall provides barriers between ledges so as to direct the animal on to steps during movement between the ledges.

4. A pet animal living structure according to claim 2 wherein the ledges are of non-planar random configuration.

5. A pet animal living structure according to claim 2 wherein the structure is an animal container with the wall providing a rear wall of the container, the container also comprising a front viewing wall and side walls extending from the rear wall to hold the front viewing wall spaced from the rear wall, and wherein at least one of the side walls is provided with openings for air to pass into the container, and the container has a top having an opening, spaces being provided between the rear wall surfaces and the front viewing wall to allow for air circulation through the openings in the side wall, through the structure and out through the top opening.

6. A pet animal living structure according to claim 5 wherein the floor surfaces are of non-planar random configuration.

7. A pet animal living structure according to the claim 5 wherein the front viewing wall is movable vertically upwards to remove it from the container, the front viewing wall being detachable held in position by channels which are carried by the side walls, the side walls and associated channels forming guides for vertical movement of the front viewing wall, and the channels have openings aligned with the openings in the side wall or walls.

8. A pet animal living structure according to claim 8 wherein the openings in the at least one side wall are recessed formed from a front face of the side wall, the recesses having floor surfaces, and the associated channel is removable to enable the container to be disposed adjacent another structure formed as a container, whereby the interiors of the two structures become interconnected.

9. A pet animal living structure comprising a wall having a base, a front side, a back side, and plurality of floor surfaces extending from front and back sides of the wall, and an aperture defined through the wall for movement of the animal through the wall, the aperture disposed at a position spaced from the base to interconnect the floor surfaces on the front side of the wall with floor surfaces on the back side of the wall.

* * * * *

UNITED STATES PATENT AND TRADEMARK OFFICE
CERTIFICATE OF CORRECTION

PATENT NO. : 5,881,676
DATED : March 16, 1999
INVENTOR(S) : Michael Brown and Kevin J. Bailey It is certified that error appears in the above-indentified patent and that said Letters Patent is hereby corrected as shown below:

Col. 10, line 3:    Delete "the"

Col. 10, line 7:    Delete "walls" and substitute --wall--

Col. 10, line 24:   Delete "surfaces"

Col. 10, line 29:   Delete "wherein the" and substitute --having--

Col. 10, line 29:   Delete "are"

Col. 10, line 34:   Delete "detachable" and substitute --detachably--

Col. 10, line 39:   Delete "claim 8" and substitute --claim 7--

Col. 10, line 41:   Delete "recessed" and substitute --recesses--

Signed and Sealed this

Twenty-seventh Day of July, 1999

Attest:

Q. TODD DICKINSON

*Attesting Officer*   *Acting Commissioner of Patents and Trademarks*